United States Patent [19]

Fourcher

[11] 4,182,270

[45] Jan. 8, 1980

[54] ABALONE HABITAT

[76] Inventor: Frederick J. Fourcher, 614 Orchid, Corona Del Mar, Calif. 92625

[21] Appl. No.: 881,017

[22] Filed: Feb. 24, 1978

[51] Int. Cl.² .............................................. A01K 61/00
[52] U.S. Cl. .......................................................... 119/4
[58] Field of Search ..................................... 119/4, 3, 2

[56] References Cited

U.S. PATENT DOCUMENTS

| | | | |
|---|---|---|---|
| 2,853,049 | 9/1958 | Glancy | 119/4 |
| 3,316,881 | 5/1967 | Fischer | 119/4 |

FOREIGN PATENT DOCUMENTS 1399933  7/1975  United Kingdom ...................... 119/4

Primary Examiner—Hugh R. Chamblee
Attorney, Agent, or Firm—Gordon L. Peterson

[57] ABSTRACT

An abalone habitat comprising a container and a plurality of non-circumscribing panels in the container to which the abalone can attach. The container is porous to allow sea water to enter the container, and the container has an opening to permit insertion and removal of the panels. There is sufficient room in the container above the upper edges of the panels to define a space for food for the abalone. At least regions of adjacent panels are spaced from each other. The panels and the container are resistant to sea water corrosion.

11 Claims, 5 Drawing Figures

U.S. Patent  Jan. 8, 1980  4,182,270
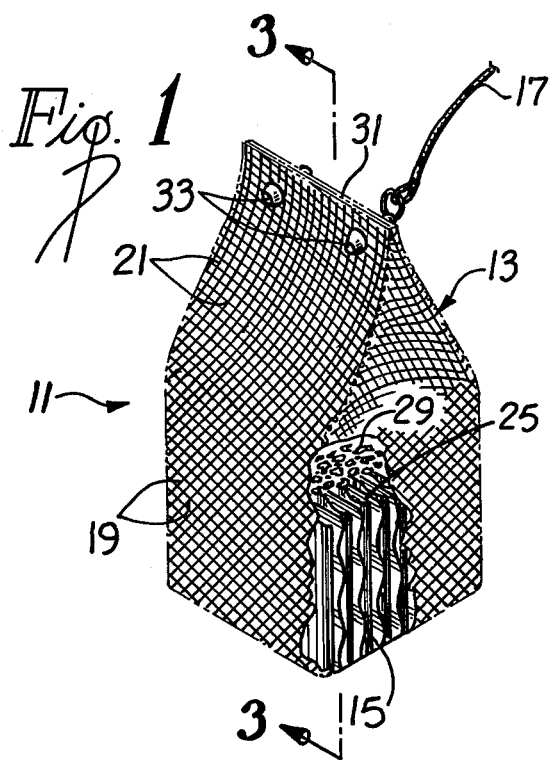
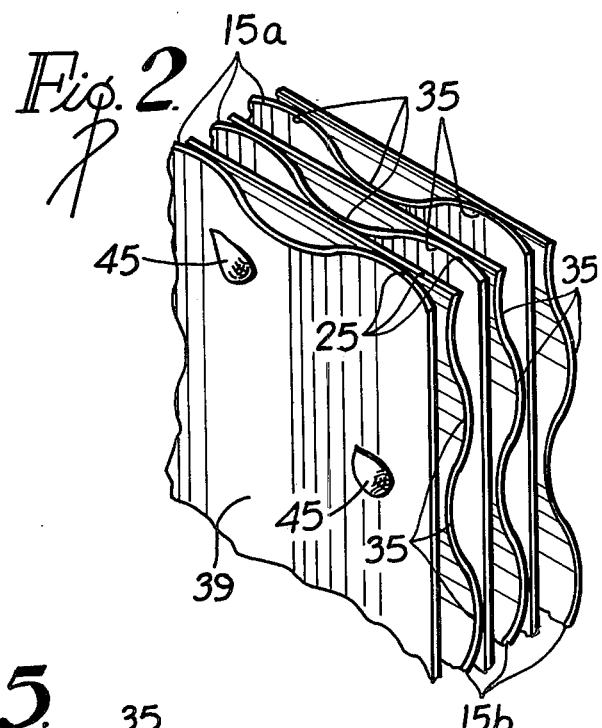
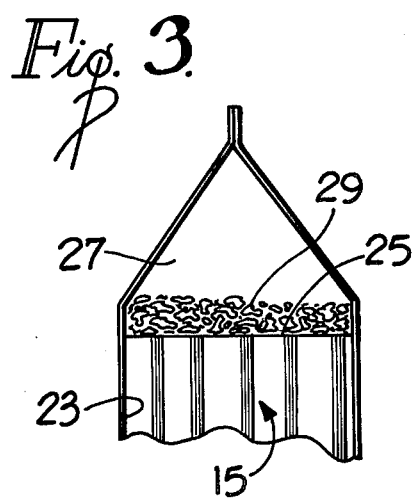
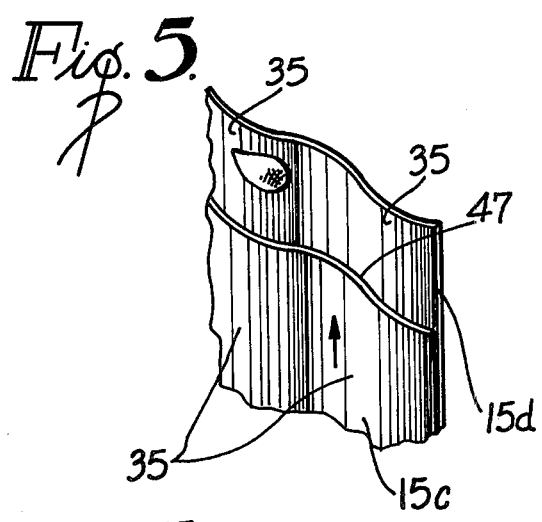
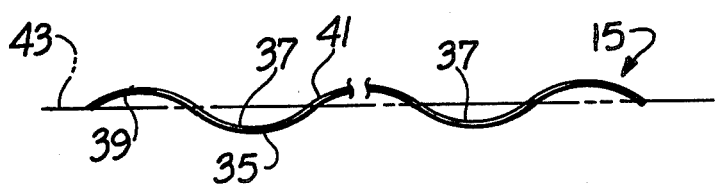
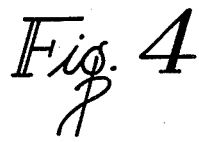

4,182,270

ABALONE HABITAT

BACKGROUND OF THE INVENTION

This invention relates to the field of mariculture, and more particularly, to the field of growing abalone in the sea. For this purpose, it is known to provide an abalone habitat. The habitats typically include members having relatively broad surfaces to which the abalone can attach. These members are appropriately confined within a housing, and food is placed in the housing for the abalone.

One prior art habitat includes a plurality of concentric rings spaced apart by concentric corrugated rings. The entire structure is mounted on a supporting structure. The abalone attach to the rings. This prior art habitat is difficult to dismantle. In addition, it is difficult to remove abalone and fouling organisms, such as barnacles from the concentric rings. Also, the sea water in which the habitat is placed moves the rings up and down relative to each other, and this tends to destroy the enclosure within which they are placed.

Another prior art abalone habitat is generally in the form of a paddle wheel. This device has insufficient surface area for the abalone, and it cannot be dismantled. It is difficult to remove abalone from the portions of the paddles which are relatively close together, and the paddles are also difficult to clean in these areas.

SUMMARY OF THE INVENTION

This invention overcomes the disadvantages noted above by providing an abalone habitat which can be easily removed. The habitat of this invention includes a container having a plurality of panels in the container. The container has an opening which permits the panels to be easily inserted into, and removed from, the container. The panels can be easily cleaned and the abalone can be easily removed from the panels when the panels are out of the container.

To facilitate cleaning of the panels and removal of the abalone from the panels, the panels should not be in the form of rings. Rather, the panels are non-circumscribing and are preferably relatively flat.

The panels are spaced from each other to provide surface area on panels to which the abalone can attach. Spacer means is provided for spacing at least regions of the panels from each other. The spacer means may take different forms and may be, for example, separate spacing members or spacing members integral with the panels. Preferably however, the panels are corrugated, and the corrugations serve as the spacer means. The corrugations can be of different configurations.

The corrugations serve a number of other useful functions. For example, the corrugations increase the surface area of the panels, and this increases the area to which the abalone can attach. By arranging the panels with the corrugations of one panel extending in one direction and the corrugations of the adjacent panel extending in another direction, only point or very small area contact between adjacent panels is obtained. This further increases the area of the panels to which abalone can attach.

The panels are preferably manually resiliently deformable. Thus, if an abalone attaches to the bottom of a corrugation, it can be easily separated by deflecting the panel.

The surfaces of the panels are preferably smooth and have a relatively low coefficient of friction. This permits the abalone, as well as any fouling organisms, to be relatively easily sheared off of the panel.

A number of advantages are obtained if the panels are substantially identical. First, identical corrugated panels can be stacked in nested relationship when they are out of the container. The space saving realized is of particular importance because the abalone habitats are frequently being used and handled aboard a boat where space is at a minimum. Also, if the corrugated panels are identical, one of the panels may be used as a scraper to scrape or shear the abalone and fouling organisms off of the other panels. The identical panels are interchangeable in the habitat, and the corrugations of contiguous panels can be run in different directions by appropriately orienting the panels as they are inserted into the container. In order that the height of the panels in the container will be the same regardless of the direction in which the corrugations extend, the panels are preferably square.

In order to provide food for the abalone in the habitat, the panels have upper edges, at least some of which are spaced from the container. Thus, a space is defined within the container above the panels in which food for the abalone can be placed.

The container has aperture means for allowing sea water to enter the interior of the container. The aperture means can be provided in different ways, such as for example, by constructing the container of netting.

The components of the habitat should be resistant to sea water corrosion. To accomplish this, the container and panels can advantageously be constructed of a corrosion resistant metal, such as stainless steel or an appropriate plastic material, such as polyvinylchloride, reinforced plastic, fiberglass, polypropylene or ABS.

The invention, together with further features and advantages thereof, may best be understood by reference to the following description taken in connection with the accompanying illustrative drawing.

BRIEF DESCRIPTION OF THE DRAWING

FIG. 1 is a perspective view with portions of the container broken away of an abalone habitat constructed in accordance with the teachings of this invention.

FIG. 2 is a fragmentary perspective view of portions of several of the panels of the abalone habitat.

FIG. 3 is a fragmentary sectional view taken generally along line 3—3 of FIG. 1.

FIG. 4 is an end elevational view of a typical one of the panels.

FIG. 5 is a perspective view illustrating how one of the panels may be used to scrape abalone off from another of the panels.

DESCRIPTION OF THE PREFERRED EMBODIMENT

FIG. 1 shows an abalone habitat 11 which generally includes a container 13 and a plurality of non-circumscribing panels 15 within the container. The habitat 11 is adapted to be placed in sea water and attached by a line or cable 17 to a suitable anchoring device, such as a buoy.

The container 13 is porous. Although the container 13 may be of various different constructions, in the embodiment illustrated, it is constructed of a plastic netting material sold by DuPont under the trademark Vexar. The netting includes a plurality of strands 19 suitably attached and spaced apart to define a plurality of apertures 21 which permit sea water to enter and leave the container 13.

As shown in FIGS. 1 and 3, the container 13 has an interior 23 in which the panels 15 are located. The panels 15 have upper edges 25 which are spaced from the upper regions of the container 13 to define a space 27 in which food 29 for the abalone can be placed. Thus, the food 29 is supported on the upper edges of the panels 15 and can be washed down between the panels for the abalone.

To permit the panels 15 to be inserted into and removed from the container 13 and to permit the food 29 to be placed on the panels, the container 13 has an opening 31. Although the opening 31 could be provided in different ways and in different locations, in the embodiment illustrated, the opening 31 is in the form of an open upper end on the container 13. The opening 31 is closed by identical fasteners 33 which may take the form of threaded fasteners or suitable quick-release fasteners. In the embodiment illustrated, the cable 17 is suitably attached to one of the fasteners 33.

Each of the panels 15 is identical and so only one of the panels is described in detail herein. Each of the panels 15 is preferably in the form of a thin plate which is flat, except for a plurality of parallel ridges or corrugations 35. Each adjacent pair of the corrugations 35 defines an elongated groove or channel 37 with each of the grooves 37 extending parallel to each other. Each of the panels 15 has broad, oppositely directed faces or surfaces 39 and 41 which are smoothly curved to define the corrugations 35.

Preferably, each of the panels 15 is square as viewed in a direction looking toward either of the faces 39 or 41. Each of the panels 15 has a neutral, flat plane 43 as viewed in end elevation (FIG. 4). The corrugations 35 form waves about the neutral plane 43. As viewed in FIG. 4, the plane 43 appears as a straight line; however, the plane 43 extends for the full length of the panel 15.

The panels 15 can be constructed of various corrosion resistant materials as described hereinabove. Preferably, each of the panels 15 is resiliently deformable. In the embodiment illustrated, the corrugations 35 act to stiffen the panel against bending about an axis extending transverse to the direction of elongation of the corrugations; however, the panel is readily resiliently bendable about an axis extending parallel to the corrugations. The panel 15 is also resiliently deformable in a direction to tend to collapse the grooves 37. This is advantageous in removing abalone attached to the faces 39 or 41 that are located near the bottom of one of the grooves 37.

Although the panels 15 are preferably identical and interchangeable, they are preferably not oriented identically within the container 13. As shown in FIG. 2, panels 15a have their corrugations 35 extending vertically and panels 15b have their corrugations extending horizontally. The panels 15a and 15b are arranged in an alternating order so that every other panel has the corrugations 35 extending vertically. With this arrangement, the contact between adjacent panels is basically reduced to a series of points with one of the points being formed at each location of contact of the corrugations 35 of adjacent panels. It is not necessary that the corrugations 35 extend horizontally and vertically, but it is preferred that the corrugations of adjacent panels 15 extend in different directions so that point contact between adjacent corrugations is obtained. This exposes a larger portion of the faces 39 and 41 for the abalone.

With the fasteners 33 removed and the opening 31 opened, the panels 15 can be inserted into the interior 23 of the container 13 using the orientation shown in FIG. 2. The panels 15 rest on the bottom of the container 13 and abalone 45 (FIG. 2) can attach to the broad faces 39 and 41 of each of the panels 15. The food 29 is placed on the upper edges 25 of the panels 15 as shown in FIG. 3.

In use, the habitat 11 is placed, for example, in the ocean and attached by the cable 17 to a suitable anchoring means, such as a buoy (not shown). The abalone 45 remain on the faces 39 and 41 of the panels 15 and consume the food 29. Periodically, it is necessary to remove the panels 15 from the container 13 to clean the panels and/or to remove the abalone 45. This can be accomplished by pulling the habitat 11 out of the water onto a boat or pier and/or by a diver. The fasteners 33 are released to open the opening 31 and the panels 15 are then removed through the opening 31. Because the panels 15 are non-circumscribing and the neutral plane 43 is basically flat, all portions of both of the faces 39 and 41 of all of the panels 15 are readily accessible for abalone removal and for cleaning.

Because the panels 15 are of identical configuration, one of the panels 15c can be used to scrape or shear abalone and fouling organisms from another panel 15b. This can be accomplished as shown in FIG. 5 by moving a panel 15c relative to a panel 15d and using an edge 47 of the panel 15c to scrape the abalone and fouling organisms off of the panel 15d. Of course, the scraping motion is in the same direction as the direction of elongation of the corrugations 35 of the panel 15d. The corrugations 35 of the panel 15c are received within the corresponding corrugations 35 of the panel 15d so that all portions of the face 39 of the panel 15d are readily contacted by the panel 15c. All of the panels 15 can be cleaned and have the abalone 45 removed therefrom in the same manner.

Because each of the panels 15 is resiliently deformable, fouling organisms and/or abalone 45 can be separated from the panel by flexing the panel. For example, an abalone at the bottom of one of the grooves 37 could be separated from the panel by resiliently deforming the panel in a way to tend to collapse the two corrugations 35 on the opposite sides of such grooves 37. When not in use, the interchangeable panels 15 can be stacked in nested relationship so as to consume a minimum amount of space.

Although an exemplary embodiment of the invention has been shown and described, many changes, modifications and substitutions may be made by one having ordinary skill in the art without necessarily departing from the spirit and scope of this invention.

I claim:

1. An abalone habitat comprising:
 a container having an interior and aperture means for allowing water to enter the interior of the container;
 said container having an opening for providing access to the interior of the container and means for opening and closing said opening;
 a plurality of non-circumscribing panels in said container to which the abalone can attach, said panels being removable from the interior of the container through said opening when the latter is open;
 each of said panels having a peripheral edge, at least some of the peripheral edges being spaced from the container to define a space within the interior of the container in which food for the abalone can be placed;

spacer means for spacing at least regions of the panels from each other whereby the abalone can attach to such spaced regions of the panels and the food can move from said space to said spaced regions; and said panels and said container being resistant to sea water corrosion.

2. An abalone habitat as defined in claim 1 wherein each of first and second of said panels is corrugated, said first and second panels being adjacent, the corrugations of the first and second panels defining at least a portion of said spacer means, and the corrugations of the first and second panels extending in different directions.

3. An abalone habitat as defined in claim 2 wherein each of said first and second panels has opposed relatively broad surfaces and is square as viewed in a direction looking toward one of said broad surfaces thereof.

4. An abalone habitat as defined in claim 1 wherein said container includes an open netting of plastic material, said netting defining said aperture means.

5. An abalone habitat as defined in claim 1 wherein said panels have relatively broad surfaces and said surfaces of said panels are relatively smooth and have a low coefficient of friction.

6. An abalone habitat as defined in claim 5 wherein at least some of said panels are corrugated, at least first and second of said corrugated panels are in confronting relationship with the corrugations of said first panel extending in a first direction and the corrugations of said second panel extending in a second direction, said first and second panels being interchangeable.

7. An abalone habitat as defined in claim 6 wherein each of said first and second panels is generally square as viewed in a direction looking toward one of said surfaces thereof, at least some of said panels being resiliently deformable to facilitate the removal of abalone from such panels.

8. An abalone habitat as defined in claim 1 wherein said spacer means includes corrugations on at least some of said panels, at least some of said corrugations extending away from said space.

9. An abalone habitat as defined in claim 1 wherein each of said peripheral edges includes an upper edge and at least a first of said panels extends downwardly from said upper edge thereof.

10. An abalone habitat as defined in claim 1 wherein each of said peripheral edges includes an upper edge, at least some of said upper edges being spaced from said container to define said space.

11. An abalone habitat as defined in claim 10 wherein said spacer means includes corrugations on at least some of said panels, some of said corrugations extending downwardly from said space.

* * * * *